United States Patent
Petrous et al.

(10) Patent No.: US 11,178,864 B2
(45) Date of Patent: Nov. 23, 2021

(54) PRE-LOADED BAIT RODENT TRAP

(71) Applicants: Ron Petrous, Commerce, MI (US); Norman George, West Bloomfield, MI (US)

(72) Inventors: Ron Petrous, Commerce, MI (US); Norman George, West Bloomfield, MI (US)

( * ) Notice: Subject to any disclaimer, the term of this patent is extended or adjusted under 35 U.S.C. 154(b) by 305 days.

(21) Appl. No.: 15/967,115

(22) Filed: Apr. 30, 2018

(65) Prior Publication Data

US 2018/0312317 A1 Nov. 1, 2018

Related U.S. Application Data

(60) Provisional application No. 62/491,821, filed on Apr. 28, 2017.

(51) Int. Cl.
*A01M 23/30* (2006.01)
*B65D 77/20* (2006.01)
*A01M 23/00* (2006.01)

(52) U.S. Cl.
CPC .......... *A01M 23/30* (2013.01); *A01M 23/005* (2013.01); *B65D 77/2024* (2013.01); *B65D 77/2032* (2013.01); *B65D 2221/00* (2013.01)

(58) Field of Classification Search
CPC . B65D 77/2032; A01M 23/005; A01M 23/30; A01M 25/002
See application file for complete search history.

(56) References Cited

U.S. PATENT DOCUMENTS

| | | | | |
|---|---|---|---|---|
| 3,968,589 | A * | 7/1976 | Basham | A01M 23/30 43/81 |
| 4,925,684 | A * | 5/1990 | Simon | B65D 81/3446 229/125.35 |
| 5,148,624 | A * | 9/1992 | Schmidt | A01M 23/30 43/81 |
| 5,548,922 | A * | 8/1996 | Wefler | A01M 1/2011 43/131 |
| 6,216,384 | B1 * | 4/2001 | Dickson | A01M 1/2005 43/131 |
| 6,574,912 | B1 * | 6/2003 | Johnson | A01M 23/26 43/58 |
| 9,210,924 | B1 * | 12/2015 | Terrell | A01M 1/2005 |
| 9,737,069 | B1 * | 8/2017 | Giles, Jr. | A01M 23/005 |
| 2003/0138472 | A1 | 7/2003 | Yonker | A01M 1/2011 424/410 |
| 2004/0134121 | A1 * | 7/2004 | Bianchini | A01M 1/2005 43/131 |
| 2007/0017149 | A1 * | 1/2007 | Rodgers | A01M 23/16 43/85 |
| 2008/0313952 | A1 * | 12/2008 | Pettigrew | A01M 25/002 43/131 |
| 2011/0072708 | A1 * | 3/2011 | Nathan | A01M 23/24 43/61 |

(Continued)

*Primary Examiner* — Monica L Barlow
(74) *Attorney, Agent, or Firm* — Cargill & Associates, PLLC; Lynn E. Cargill (57) ABSTRACT

A rodent trap incorporating a pre-loaded bait of non-artificial fresh food in a pre-sealed container that is covered by a peelable sheeted material such that when setting the trap, an operator will peel off the sheeted material to expose the fresh food bait and then set the trap. The pre-loaded bait container finds utility in bail-type traps as well as adhesive glue traps.

2 Claims, 6 Drawing Sheets

(56) References Cited

U.S. PATENT DOCUMENTS

2012/0011764 A1* 1/2012 Dobias .................. A01M 23/30
　　　　　　　　　　　　　　　　　　　　　　43/81
2018/0271083 A1* 9/2018 Crezee ................ A01M 31/002

\* cited by examiner

PRE-LOADED BAIT RODENT TRAP

CROSS-REFERENCE TO RELATED APPLICATIONS

This application claims the benefit under 35 U.S.C. 119(e) of U.S. Provisional Application No. 62/491,821 filed on Apr. 28, 2017.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to a rodent trap, methods of manufacturing same, and methods of using same, and more particularly, the invention relates to a rodent trap with a pre-loaded non-artificial food-containing sealed container engaged on a bail anchor of the rodent trap.

2. Description of the Prior Art

Conventional rodent traps are well known in the art, including one of the most common types of spring loaded rodent trap upon which bait must be placed or, in the alternative, a rodent trap that includes a glue surface with bait placed in such a position that a rodent, such as a rodent or rat would need to walk across the glue to reach the bait. In these prior art devices, once the rodent gets stuck in the glue, a poison in the glue will kill the rodent. Then, the entire trap, with the adhered rodent, is tossed away.

However, practitioners of those inventions have become aware of certain problems which are presented by those prior art inventions. One particular problem that has plagued users has been that fresh food bait must be individually applied to the rodent trap to attract the rodents. There are complexities which give rise to people who wish to bait the rodent trap where bait is unavailable.

Imagine that you are a landlord and you have to set many traps in your properties. This landlord would have to carry around some fresh bait, such as a jar of peanut butter or a can of cheese to bait all the traps. In the event that no bait is nearby, the landlord would have to stop what he was doing and travel to a grocery store to purchase the bait, return to the site where the bait is to be placed in the rodent trap, actually bait each and every trap and then set the trap. This takes time and extra money and is not convenient.

Furthermore, many individuals that need to set a trap do not want to touch the traps, nor do they wish to be very involved in loading the trap

SUMMARY OF THE INVENTION

In accordance with the above-noted desires of the industry, the present invention provides various aspects, including a pre-loaded rodent trap, a method of making same, and a method of using a non-artificial food bait in a rodent trap. The inventors believe the rodent eradication industry will find a market for their novel pre-loaded rodent trap having fresh food bait already attached to the rodent trap in a sealed container that could be opened at the site where the trap is to be set, as well as a method of making this better rodent trap, and a method of using it. Their trap is pre-loaded with fresh food bait, requiring structural differences and manufacturing techniques not taught in the prior art.

A first aspect of the present invention includes certain features including a pre-loaded rodent trap with a non-artificial food bait in a sealed container recessed into a bail anchor of a rodent trap made in accordance with the present invention. This provides convenience to a rodent trap purchaser as the fresh food bait is already on the trap. The freshness of the non-artificial food is preserved because it is contained in a pre-loaded and sealed container sized to be usable on a bail anchor.

Another aspect of the invention has other features including a separate sealed bait container with a peel-off foil to expose the food, ready to be adhered to a rodent trap on the bail anchor. The food container is preferably much like a restaurant-style jelly tub with a peel off foil seal on top, and an optional peel off release layer on the bottom for exposing an adhesive. The adhesive under layer is useful for adhering the fresh food sealed container to the bail anchor, so that rodents cannot carry the fresh food sealed container away from the rodent trap, thereby defeating the purpose.

Another aspect of the present invention includes the manufacturing method of stamping the bail anchor into a configuration for receiving a foil sealed non-artificial fresh food container to be received therein. The method includes providing the bail anchor and stamping a recess into the distal end of the bail anchor. The next step is to either place a sealed container into the recess such that a foil top can be peeled off to expose the fresh food, or fresh food can be applied into the recess and then followed by a step of sealing the now-filled recess with a peel off top.

The method of using the present invention is accomplished by peeling off the seal from the fresh food sealed container to expose the food for bait, and then setting the holding bar to trigger the trap.

Alternative aspects include placing the sealed bait container in a rodent trap with glue and poison on the floor of the trap, exposing the fresh food from the sealed fresh food container to lure the rodent across the glue, and following the same techniques as described above.

Although the invention will be described by way of examples hereinbelow for specific aspects having certain features, it must also be realized that minor modifications that do not require undo experimentation on the part of the practitioner are covered within the scope and breadth of this invention. Additional advantages and other novel features of the present invention will be set forth in the description that follows and in particular will be apparent to those skilled in the art upon examination or may be learned within the practice of the invention. Therefore, the invention is capable of many other different aspects and its details are capable of modifications of various aspects which will be obvious to those of ordinary skill in the art all without departing from the spirit of the present invention. Accordingly, the rest of the description will be regarded as illustrative rather than restrictive.

BRIEF DESCRIPTION OF THE DRAWINGS

For a further understanding of the nature and advantages of the expected scope and various aspects of the present invention, reference shall be made to the following detailed description, and when taken in conjunction with the accompanying drawings, in which like parts are given the same reference numerals, and wherein.

DETAILED DESCRIPTION OF THE INVENTION

Referring now to the drawings in detail, there are numerous aspects to the present invention, ie first, a novel preformed bail anchor on a single use rodent trap with a recess in the bail anchor for receiving fresh, non-artificial food sealed for convenience with a peel-off sheet to expose the food, second, a pre-loaded and sealed non-artificial bait container to be formed into the base of a glue-type rodent trap, and third, a pre-loaded and sealed non-artificial bait container to be adhered to a multi-use rodent trap with a bail anchor configured to receive such a sealed bait container.

Figure 1A:
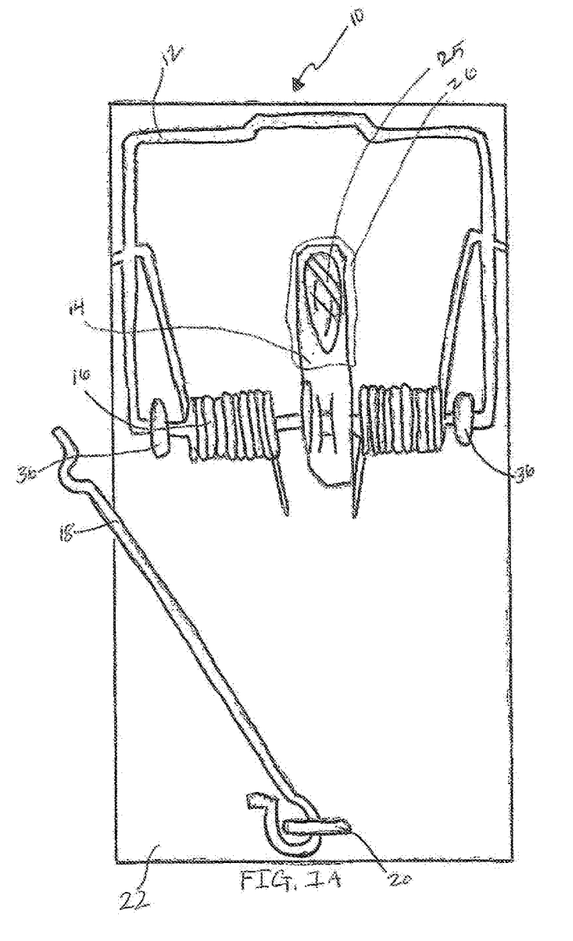
FIG. 1A is a top plan view of a rodent trap 10 made in accordance with the present invention.

FIG. 1A is a top plan view of a rodent trap 10 made in accordance with the first aspect of the present invention providing a bail anchor with an integral sealed containment of non-artificial fresh food. The rodent trap is generally indicated by the numeral 10, which includes a hammer 12 for killing the rodent and a bail anchor 14 connected to a spring 16. In this aspect as shown in FIG. 1A, bail anchor 14 is a one piece construction that includes a recess 25 for containing non-artificial bait food 24 sealed by peel-off sheeted sealer 26. The bail anchor assembly 14 is in communication with spring 16 and hammer 12, which are all attached to the top of a platform 22. Holding bar anchor 20 supports holding bar 18 which acts as a trigger for the trap 10. Hammer anchors 36 are located on either side of hammer 12 to secure hammer 12 in place on platform 22.

Figure 1B:
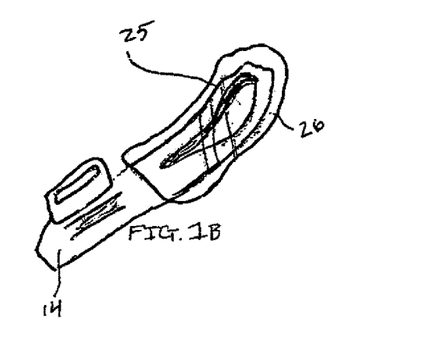
FIG. 1B illustrates a perspective view of a bail anchor 14 with fresh, non-artificial food 24 being sealed by a peel-off sheeted sealer 26.

FIG. 1B is a perspective view of a first aspect of the present invention wherein bail anchor 14 has a formed recess therein which is adapted to receive food 24 and is sealed with a peel-off sheeted sealer 26.

Figure 1C:
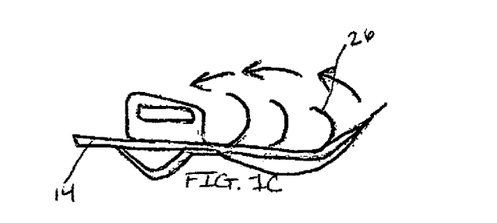
FIG. 1C shows a side elevational view of the sealer 26 of FIG. 1B being removed from the bail anchor 14 exposing some fresh, non-artificial food.
Figure 1D:
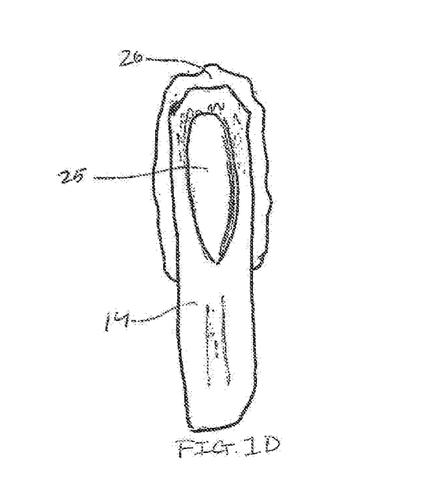
FIG. 1D is a bottom plan view of the bail anchor 14 with a recess extending downwardly and containing fresh, non-artificial food 24 being sealed by a sealer 26.

FIG. 1C is a side elevational view of bail anchor 14 illustrating how sealer 26 is peeled back to expose non-artificial fresh food 24. With combined reference to FIGS. 1C and 1D, there can be seen the relative placement of non-artificial fresh food 24 received within bail anchor 14. This view of FIG. 1D is from the bottom, where sealer 26 is a sheeted membrane shown covering the non-artificial fresh food 24 from the top.

Figure 2A:
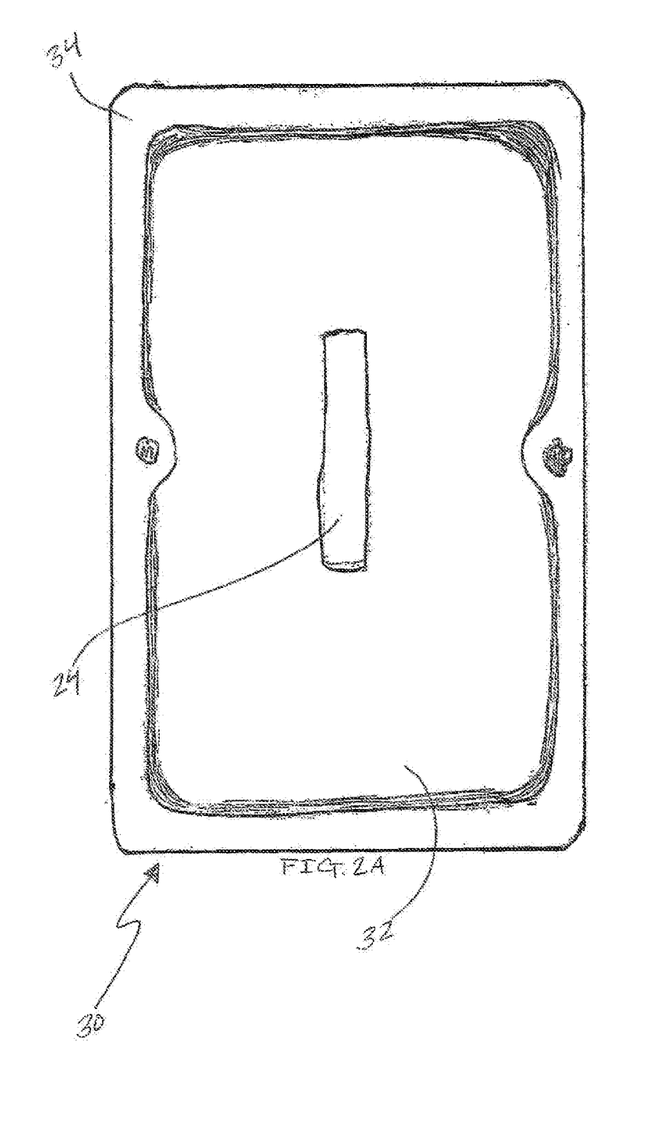
FIG. 2A illustrates a top plan view of a rodent glue trap 30.
Figure 2B:
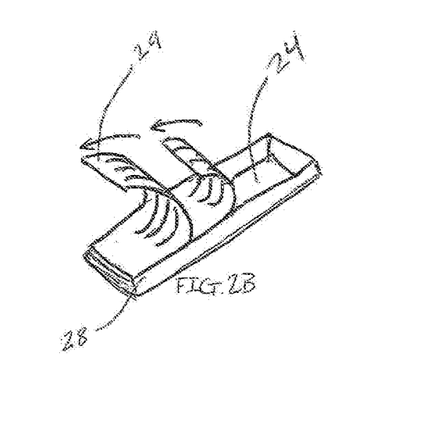
FIG. 2B. is a perspective view of a food container 28 as the peel-off sheet 29 is being removed to expose food 24.

FIG. 2A shows a second aspect of the present invention including a glue-type rodent trap generally denoted by numeral 30, including a base 34 onto which a glue 32 has been applied. In the interior of glue 32 is the non-artificial fresh food 24. As can be seen in FIG. 2B, a peel-off sheeted seal 29 is shown in various stages of the sealer 29 being removed from food container 28. Food container 28 includes therein non-artificial fresh food 24. Preferably, glue 32 includes a poison to shorten the lifespan of the captured rodent.

Figures 3A, 3B, 3C:
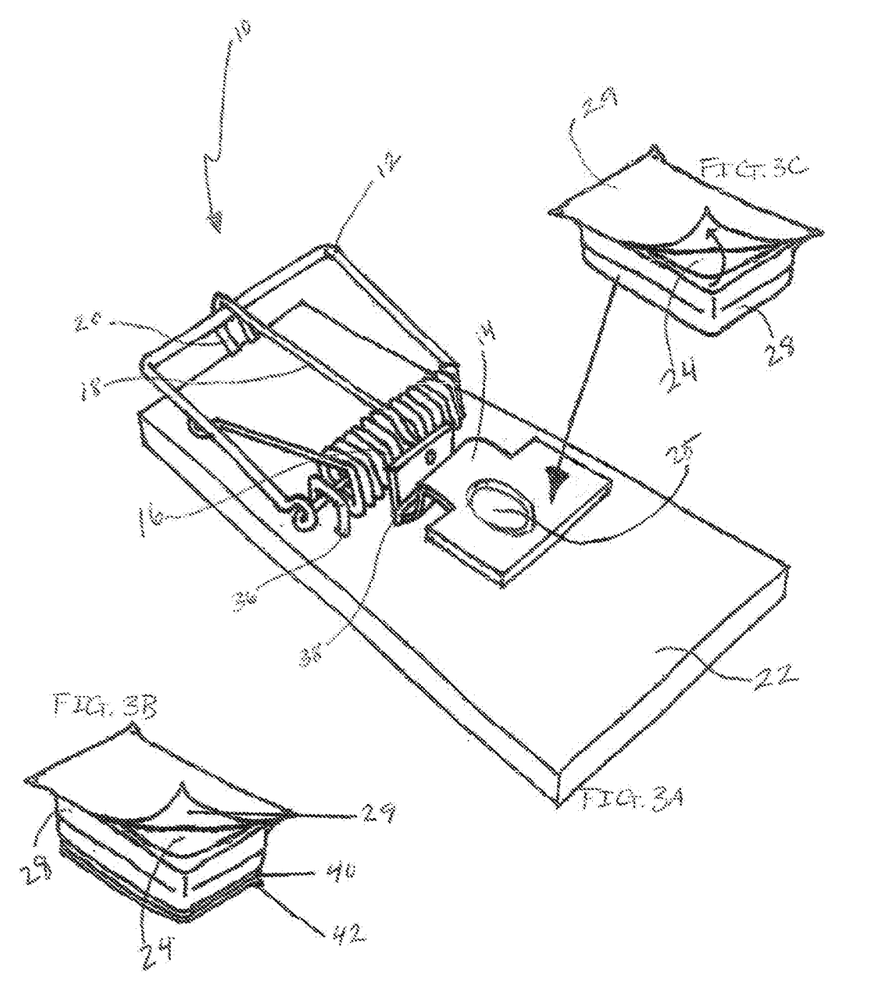
FIG. 3A is a top perspective view of a rodent trap 10.
FIG. 3B illustrates a perspective view of a food container 28 with a peel-off sheet 29 on top with a lower release layer 42 exposing adhesive 40.
FIG. 3C shows a perspective view of a food container 28 with a peel-off sheet 29 secured over the food container.

FIG. 3A shows a rodent trap generally denoted by numeral 10 with a hammer 12 and a bail anchor 14 adapted for receiving a small non-artificial food container 28 with a peel-off sealer top 29 and optionally an adhesive layer 40 on the bottom of food container 28. In order to have this aspect of the food container 28 to be readily handled, a release layer 42 completely covers adhesive 40. In order to exercise the method of the present invention, release layer 42 is peeled off to expose adhesive layer 40, and then food container 28 is adhered on to bail anchor 14. FIGS. 3B and 3C show food container 28 with non-artificial fresh food 24 therein. Peel-off sheet 29 is showing the method of using the present invention by peeling off the peel-off sheet 29 to expose the non-artificial fresh food 24.

In all aspects of the present invention, a rodent trap, whether the conventional spring-type trap or a glue-type trap, may be advantageously manufactured to include a pre-loaded fresh bait, which has, until now, never been realized. The advantage of providing a sealed container of non-artificial fresh food is that the consumer does not need to carry around any separate bait material. In many aspects of the present invention, a bait food container having non-artificial fresh food therein is or will become a part of the rodent trap, such that when a sealer or peel-off sheet membrane is peeled off or otherwise removed, the fresh food bait is exposed, ready to attract a rodent.

In many aspects of the present invention, the fresh food may include peanut butter, pureed foodstuffs, including pureed fruits, nuts, seeds, cheeses, apple sauce, bird seed, sunflower seeds, or any other desirable fresh food bait that will not perish substantially immediately when placed into a small, sealed food container. Such foodstuffs may also act as an attractant for animals and bugs beyond mice and rats. Further, other food stuffs may be advantageous.

The present invention may be applicable for use in many different types of rodents, including mice, rats, moles, gophers, shrews and voles, among others. Each of these rodents may prefer particular types of bait, and those baits will preferably be fresh food or other attractant, which is not an artificially scented piece of plastic, such as in the prior art. Such fresh food bait materials may be selected especially for the type of rodent which is being caught. The fresh food is especially suitable if it is resistant to rot inside a sealed food container with a peel off sealer top.

For example, black rats which are found throughout the world, prefer bait such as slugs, insects, berries, fruit jam, dried fruits, nuts, or snails. In addition, some rodents are attracted to various nesting materials such as dental floss or other string like materials. Each of these baits can be used for any rodent as well. The present invention shall not be limited to these listed food bait materials, but rather this list can be expanded to include any suitable food bait.

Furthermore, the present invention relates to a sealed container for non-artificial fresh food that can be adapted to any type of rodent trap. Non-artificial foodstuffs suitable for the present invention are best represented by foods that do not perish quickly at room temperature within a sealed container. In order to keep the food fresh, one aspect of the present invention may include nitrogen packing of the food to prevent spoilage. In that regard, nitrogen gas would be injected into the food bearing cavity of the sealed container prior to sealing, so that oxidation of the foodstuff contained in the sealed container would be minimized. Nitrogen injection is known in the food preservation art, although it has not been used heretofore in combination with pre-loading of rodent trap bait into sealed containers.

Figure 4A:
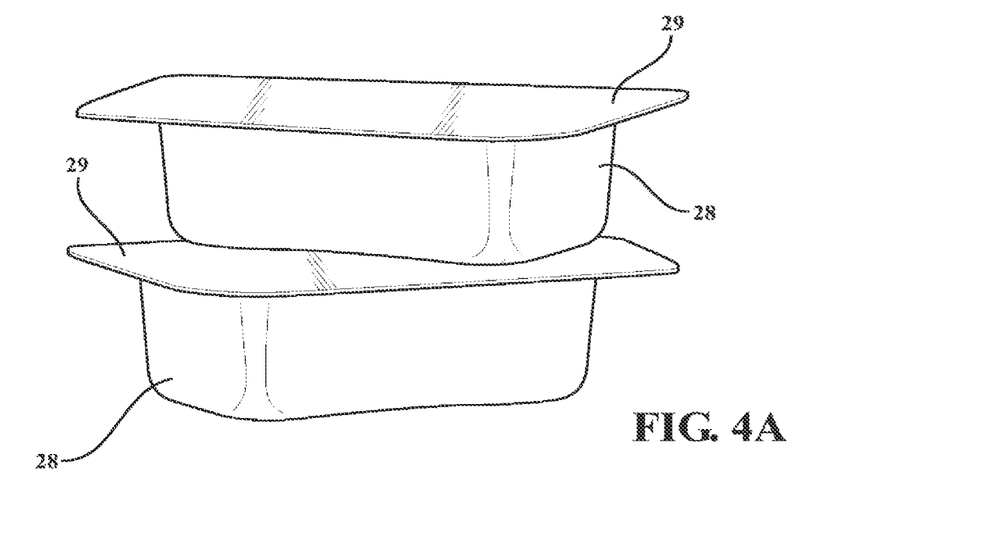
FIG. 4A is a side perspective view of two food containers 28 with a peel-off sheet 29.
Figure 4B:
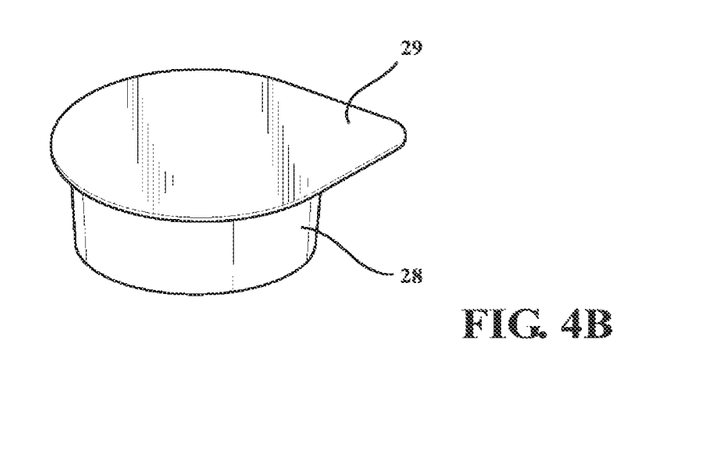
FIG. 4B illustrates a top perspective view of a food container 28 with a peel-off sheet 29.

FIGS. 4A and 4B are collectively showing various aspects of food containers 28 with peel-off sheet tops 29, shown here as jelly or jam containers. As described above, any suitable fresh food bait can be placed into the containers and then either incorporated into the rodent trap originally manufactured piece, or the food container can be sold along with the conventional trap and merely adhered to the catch of the trap. The overall objective is to provide convenience to the consumer by either pre-loading the fresh food bait with a sealer to expose the bait or to provide a bait container to be adhered to the trap for ease of use. It is also envisioned by the present inventors that individual fresh food containers adapted for being adhered to a trap can be sold in order to replenish a previously used trap.

Peel-off sheet tops 29 are preferably made of sheeted materials including plastic sheeted materials, metallic foils, waxed papers, and recycled materials. These suitable sheeted materials are adhered to the upper lip of the pre-loaded bait container, attempting to avoid adherence to the rodent attracting foodstuff contained therein. Adhesives which are easy to peel from the upper lip of the container are selected to provide an easy to peel configuration, where a consumer is able to peel off the sheeted material prior to setting the rodent trap, thereby exposing fresh food to attract the rodent or bugs. The sheeted material top cover in the sealed container may also be adhered by heat sealing the sheeted material onto the container, thereby preserving the freshness of the fresh food bait contained there in.

The peel-off top sheeted material may also be made of any sort of thermoset or thermoplastic resin, a foamed agent, a medium or dense foam piece, a rubber-like substance, rubber itself, or any other type of standard sheeted material that may be used for the peel-off top 29. The adhesives used to adhere the sheeted peel-off top to the pre-loaded bait container may be selected from the group consisting of hot-melts, acrylic-types, tackifying resins, acrylic acid esters of monohydric alcohols, alpha-olefins, monoethylenically unsaturated copolymerizable monomers, a blend of poly (propylene-co-higher 1-olefin), tackifying resin and crystalline propylene containing polymer, mixed block polymer adhesive, block copolymers, pressure-sensitive tape having a plurality of adhesive layers, elastomeric adhesives that include natural rubbers, polychloroprenes (neoprene), acrylonitride butadiene (nitrile), butyl rubber adhesives, styrene butadiene rubber, thermoplastic adhesives that include polyvinyl acetate (PVA), polyvinyl alcohol (PVA), polyacrylates, polyester acrylics, acrylic solvent cement, silicone resins, polyamides and acrylic acid diesters. adhesives, polyurethane adhesives, polysulphide rubber adhesives, silicone rubber adhesives, or any combination thereof.

These hot-melt adhesive compositions have a novel combination of properties including T-peel and lap shear bonds to both low- and high-density polyethylene with excellent creep resistance at ambient temperatures. The peel strength of the adhesive is preferably from about 0.01 N/mm to about 15 N/mm. Furthermore, a pressure-sensitive adhesive should have a shear strength of from about 0.01 MPa (N/mm2) to about 75 MPa (N/mm2), but preferably from about 1 MPa (N/mm2) to about 10 MPa (N/mm2).

An adhesive is a substance that fastens or bonds materials using surface attachment. The strength of an adhesive joint depends on the strength of the attachment of the adhesive to the material surface substrate termed adhesion and strength of the adhesive termed cohesion. In these aspects of the present invention, adhesives provide the sealing function.

Figure 5A:
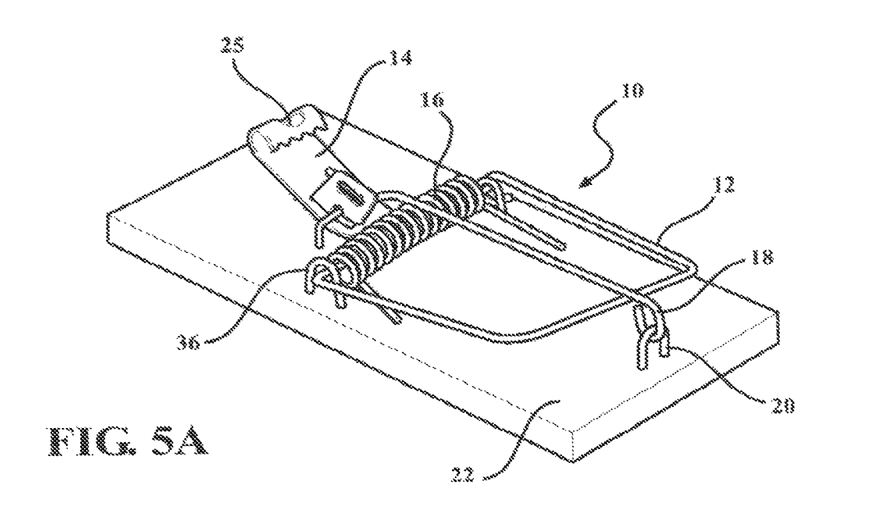
FIG. 5A is a top perspective view of a prior art rodent trap.
Figure 5B:
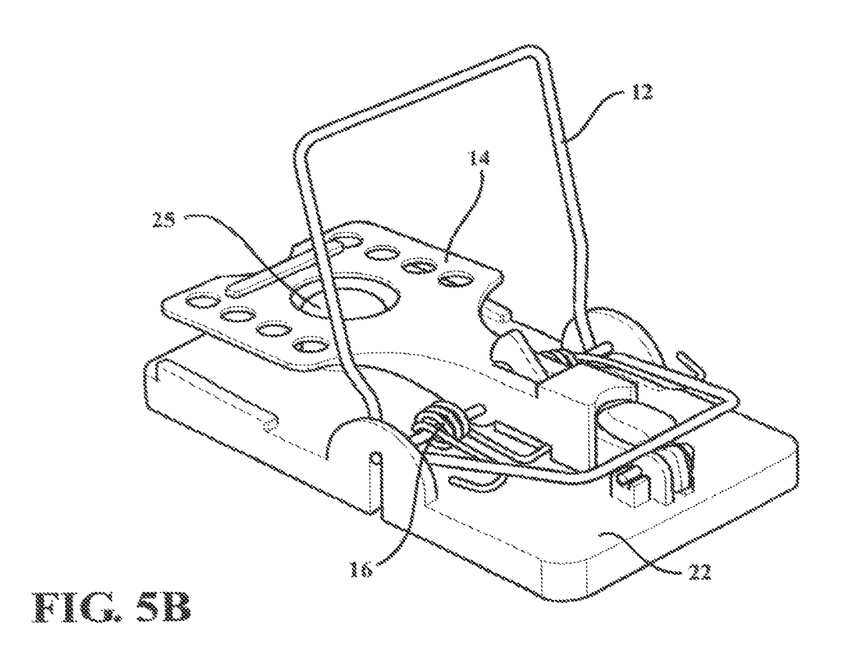
FIG. 5B illustrates a top perspective view of another prior art rodent trap.
Figure 5C:
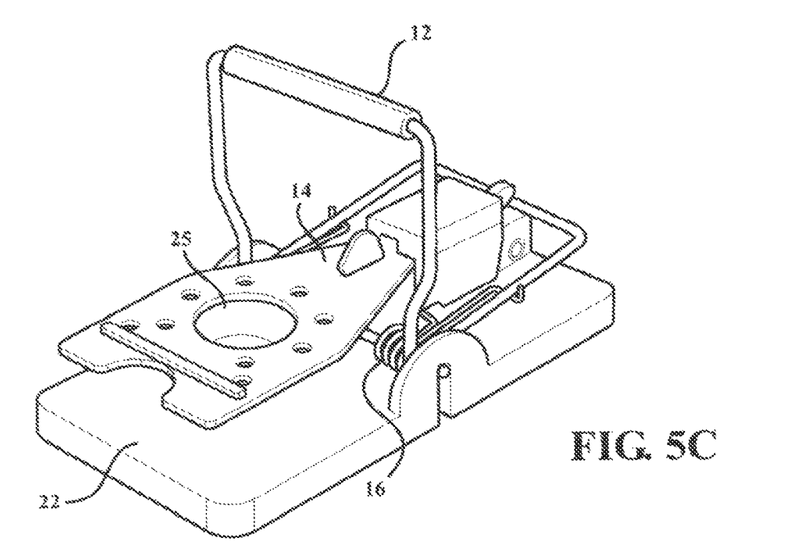
FIG. 5C shows a side perspective view of a third prior art rodent trap.

With combined reference to FIG. 5A through 5D, there are shown numerous prior art rodent traps which can be easily adapted to receive a pre-loaded non-artificial fresh food container in accordance with various aspects of the present invention. In each of these prior art trap configurations, the trap is generally denoted by numeral 10 including a hammer 12, a bail anchor 14, a spring 16, and a platform 22. In FIG. 5A, a holding bar anchor 20 maintains the position of holding bar 18 to set the trap. FIG. 5B shows yet another commercially available Victor® rodent trap, which is commercially available from Woodstream Corporation of Lititz, Pa., showing the relative placement of hammer 12, bail anchor 14, spring 16, all being assembled on to platform 22. Recess 25 is formed into bail anchor 14, and may be adapted to receive one of the non-artificial fresh food containers described hereinabove.

Figure 5D:
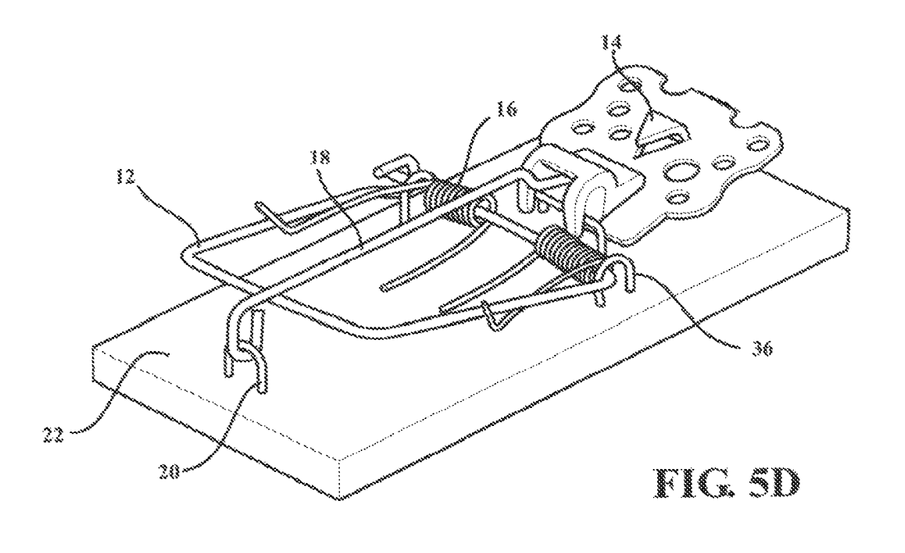
FIG. 5D is a side perspective view of a fourth rodent trap.

FIG. 5C again illustrates a rodent trap with a hammer 12, a bail anchor 14, and at least a spring 16, all assembled on platform 22. Recess 25 adapted for receiving a non-artificial fresh food container made in accordance with the present invention. FIG. 5D shows a commercially available rodent trap h the name Catch Master, a trademark of A,P & G Co., Inc. of Bayonne, New Jersey, including a hammer 12, a bail anchor 14, a spring 16, a holding bar 18, all assembled on a platform 22.

The foregoing description of a preferred aspect of the invention has been presented for purposes of illustration and description. It is not intended to be exhaustive or to limit the invention to the precise form disclosed. Obvious modifications or variations are possible in light of the above teachings with regards to the specific aspects. The aspect was chosen and described in order to best illustrate the principles of the invention and its practical applications to thereby enable one of ordinary skill in the art to best utilize the invention in various aspects and with various modifications as are suited to the particular use contemplated. It is intended that the scope of the invention be defined by the claims which are appended hereto.

What is claimed is:

1. A rodent trap, comprising:
   a rodent trap platform including a base, a bail, a spring and a hook; and
   a bail anchor attached to the bail and having a recess containing an individually portion sized container of a replenishable non-artificial fresh food bait for attracting rodents that has a peelable sheeted material covering the fresh food bait and sealing off the bait to maintain freshness; and said bail anchor being capable of triggering the rodent trap when a rodent applies its weight thereon while attempting to eat the bait once the peelable sheeted material has been removed, thereby exposing the fresh food bait.

2. A rodent trap, comprising:
   a rodent trap platform including a base, a bail, a spring and a hook;
   an interchangeable container containing an individually sized portion of replenishable, rot resistant non-artificial fresh food bait for attracting rodents, said interchangeable container having a top and a bottom;
   a removable, peelable sheeted material covering the top of the interchangeable container containing the non-artificial fresh food bait, wherein prior to it being removed, the peelable sheeted material seals off the container to maintain freshness of the fresh food bait during shipping and display at a sales location;
   a bail anchor receiving the interchangeable container thereon; and
   a sheeted peel off release underlayer on the bottom of the container covering an adhesive layer, said sheeted peel off release underlayer being removable by peeling off for exposing the adhesive, wherein the adhesive adheres the interchangeable container to the bail anchor, so that rodents cannot carry the interchangeable container away from the rodent trap;
   said bail anchor being capable of triggering the trap when a rodent applies its weight thereon while attempting to eat the bait.

* * * * *